(12) United States Patent
Ansari et al.

(10) Patent No.: US 9,246,334 B2
(45) Date of Patent: Jan. 26, 2016

(54) ALLEVIATING SOLAR ENERGY CONGESTION IN THE DISTRIBUTION GRID VIA SMART METERING COMMUNICATIONS

(71) Applicant: New Jersey Institute of Technology, Newark, NJ (US)

(72) Inventors: Nirwan Ansari, Montville, NJ (US); Chun-Hao Lo, Riverdale, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 554 days.

(21) Appl. No.: 13/661,017

(22) Filed: Oct. 25, 2012

(65) Prior Publication Data

US 2014/0121849 A1   May 1, 2014

(51) Int. Cl.
| | |
|---|---|
| *G05D 11/00* | (2006.01) |
| *H02J 3/38* | (2006.01) |
| *H02J 13/00* | (2006.01) |
| *H02J 3/00* | (2006.01) |
| *G01D 4/00* | (2006.01) |

(52) U.S. Cl.
CPC ............. *H02J 3/383* (2013.01); *H02J 13/0013* (2013.01); *G01D 4/002* (2013.01); *H02J 3/008* (2013.01); *Y02B 70/3216* (2013.01); *Y02B 70/346* (2013.01); *Y02B 90/241* (2013.01); *Y02B 90/246* (2013.01); *Y02B 90/2607* (2013.01); *Y02E 10/563* (2013.01); *Y04S 20/221* (2013.01); *Y04S 20/32* (2013.01); *Y04S 20/42* (2013.01); *Y04S 20/525* (2013.01); *Y04S 40/12* (2013.01); *Y04S 50/10* (2013.01)

(58) Field of Classification Search
CPC .............................. H02J 3/383; H02J 13/0013
USPC ............ 700/293, 295, 297; 705/412; 323/205
See application file for complete search history.

(56) References Cited

U.S. PATENT DOCUMENTS

| | | |
|---|---|---|
| 2008/0177678 A1 | 7/2008 | Martini et al. |
| 2011/0172835 A1 | 7/2011 | Imes |
| 2013/0024036 A1* | 1/2013 | Ippolito et al. ................ 700/291 |

OTHER PUBLICATIONS

IEEE 802.15.4g IEEE Standard for Local and metropolitan area networks—Part 15.4: Low-Rate Wireless Personal Area Networks (LR-WPANs) Amendment 3: Physical Layer (PHY) Specifications for Low-Data-Rate, Wireless, Smart Metering Utility Networks, Apr. 27, 2012.
Lasseter, R.H, "CERTS Microgrid," IEEE International Conference on System of Systems Engineering (SoSE), pp. 1-5 (Apr. 16-18, 2007).

(Continued)

*Primary Examiner* — Michael D Masinick
*Assistant Examiner* — Sheela S Rao
(74) *Attorney, Agent, or Firm* — Turk IP Law, LLC

(57) ABSTRACT

Technologies are generally described for alleviating solar power congestion in a distribution grid via smart metering communications. According to some examples, a power network system supervised by utility operators may monitor and control grid-tied power generation modules associated with consumers to ensure the distribution grid is stable in terms of network capacity limit. A communications infrastructure including home area networks (HANs) and neighborhood area networks (NANs) between smart meters and utility control centers may facilitate power congestion management. Utility control centers (UCCs) in cooperation with smart meters or energy management units (EMUs) may selectively disconnect consumer power generation units to maintain the system reliability.

31 Claims, 8 Drawing Sheets

(56) References Cited

OTHER PUBLICATIONS

Liu, B., et al., "Cost Control of the Transmission Congestion Management in Electricity Systems Based on Ant Colony Algorithm," Energy and Power Engineering, vol. 3, No. 1, pp. 17-23,( Feb. 2011 ).

Liu, J., et al., "Identify the impact of distributed resources on congestion management," IEEE Transactions on Power Delivery, vol. 20, No. 3, pp. 1998-2005 (Jul. 2005).

Moradi, M.H., et al., "Improving Congestion Relief Management as Ancillary Service in Operation Planning Phase with Demand Side's Presence," Canadian Journal on Electrical and Electronics Engineering, vol. 2, No. 5, pp. 145-152 (May 2011).

Saini, A., and Saxena, A.K., "Optimal Power Flow Based Congestion Management Methods for Competitive Electricity Markets," International Journal of Computer and Electrical Engineering, vol. 2, No. 1, pp. 73-80 (Feb. 2010).

Explore Petra Solar's Smart Energy Solutions, Dec. 28, 2011; www.petrasolar.com/company/explore-petra-solar.

Rogers, et al.; Examples of Wind Energy Curtailment Practices, National Renewable Energy Laboratory, Jul. 2010.

Jones, Balancing Act: How Can We Deal with Variability? Renewable Energy World.com, Nov. 10, 2011; http://www.renewableenergyworld.com/rea/news/article/2011/11/balancing-act.

* cited by examiner

COMPUTER PROGRAM PRODUCT 800

SIGNAL BEARING MEDIUM 802

804 AT LEAST ONE OF

ONE OR MORE INSTRUCTIONS FOR DETERMINING A POWER CONSUMPTION AND A POWER GENERATION WITHIN A HOUSEHOLD;
  ONE OR MORE INSTRUCTIONS FOR DETERMINING AN ENERGY PROFILE FOR THE HOUSEHOLD BASED ON THE POWER CONSUMPTION AND THE POWER GENERATION;
  ONE OR MORE INSTRUCTIONS FOR TRANSMITTING THE ENERGY PROFILE TO A UTILITY CONTROL CENTER (UCC);
  ONE OR MORE INSTRUCTIONS FOR DISCONNECTING FROM THE POWER GRID DURING A POWER CONGESTION CONDITION WHEN AN ENERGY SURPLUS IS DETERMINED FOR THE HOUSEHOLD;
  ONE OR MORE INSTRUCTIONS FOR EVALUATING IF ONE OR MORE OF AN INCREASE IN THE POWER CONSUMPTION AND/OR A DECREASE IN THE POWER GENERATION HAS OCCURRED; AND/OR
  ONE OR MORE INSTRUCTIONS FOR NOTIFYING THE UCC WITH A REQUEST FOR RECONNECTING TO THE POWER GRID IN A DISCONNECTED STATE.

| COMPUTER-READABLE MEDIUM 806 | RECORDABLE MEDIUM 808 | COMMUNICATIONS MEDIUM 810 |

FIG. 8

ALLEVIATING SOLAR ENERGY CONGESTION IN THE DISTRIBUTION GRID VIA SMART METERING COMMUNICATIONS

BACKGROUND

Unless otherwise indicated herein, the materials described in this section are not prior art to the claims in this application and are not admitted to be prior art by inclusion in this section.

Traditional power grids, where energy is distributed from one or more sources (electricity generators) to numerous destinations (consumers of electricity), are increasingly being replaced or modified to include new forms of power generation. One of the new sources of power for power grids includes power generated by the consumers of electricity (e.g., through solar or wind power conversion) that can be provided to the grid when the consumers have a power surplus. For example, smart meters may be used at households with power generating capability and provide surplus power back to the grid for a pre-arranged price or credit toward consumed power.

Rising power consumption and generation may provoke frequent power congestion in the electric power system, however. Congestion-prone locations may often be discovered in urban regions, where peak-loads may occur because of insufficient transmission lines, transfer capability, and/or transmission capacity. The increasing deployment of distributed power resources close to end-use sectors may incur local congestion and deterioration in the distribution grid as well (e.g., electric equipment damages and power outages), when power control and management is not properly engineered.

SUMMARY

The present disclosure generally describes methods, apparatus, systems, devices, and/or computer program products related to alleviating solar power congestion in distribution grid via smart metering communications.

According to some example embodiments, various methods for managing power congestion conditions in a power grid through smart metering communications (SMC) are described. Example methods may include receiving energy profile information from a smart meter and/or during a power congestion condition evaluating the received energy profile information to determine if the unit has surplus power. The smart meter may be associated with a unit, and the method may further include instructing the smart meter to disconnect from the grid and transitioning the smart meter into one of an islanded mode or a standby mode when the unit is determined to have power surplus.

According to other example embodiments, various methods for managing unit power consumption in a smart power grid through smart metering communications (SMC) are described. Example methods may include determining, at an energy management unit (EMU), a power consumption and a power generation within a unit through communication with a power generation system and one or more appliances over a Home Area Network (HAN) and/or determining an energy profile for the unit based on the power consumption and the power generation. The method may also include transmitting the energy profile to a utility control center (UCC) and/or disconnecting the unit from the power grid upon receiving instructions from the UCC when the grid is in a power congestion condition.

According to further example embodiments, a utility control center (UCC) adapted to manage power congestion conditions in a power grid through smart metering communications (SMC) is described. An example UCC may include a communication module configured to communicate with smart meters through a Neighborhood Area Network (NAN), where the smart meters are associated with units on the power grid, and one or more processing units coupled to the communication module. The processing units may receive energy profile information from a smart meter and/or evaluate the received energy profile information to determine if the unit has surplus power during a power congestion condition. The processing units may also instruct the smart meter to disconnect from the grid and transition the smart meter into one of an islanded mode or a standby mode when the unit is determined to have power surplus.

According to yet other example embodiments, an apparatus adapted to manage unit power consumption in a smart power grid through smart metering communications (SMC) is described. An example apparatus may include a communication module configured to communicate with a power generation system and one or more appliances over a Home Area Network (HAN) associated with a unit, and a processor coupled to the communication module. The processor may determine a power consumption and a power generation within the unit through communication with the power generation system and the one or more appliances over the HAN and/or determine an energy profile for the unit based on the power consumption and the power generation. The processor may also transmit the energy profile to a utility control center (UCC) and/or disconnect the unit from the power grid upon receiving instructions from the UCC when the grid is in a power congestion condition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
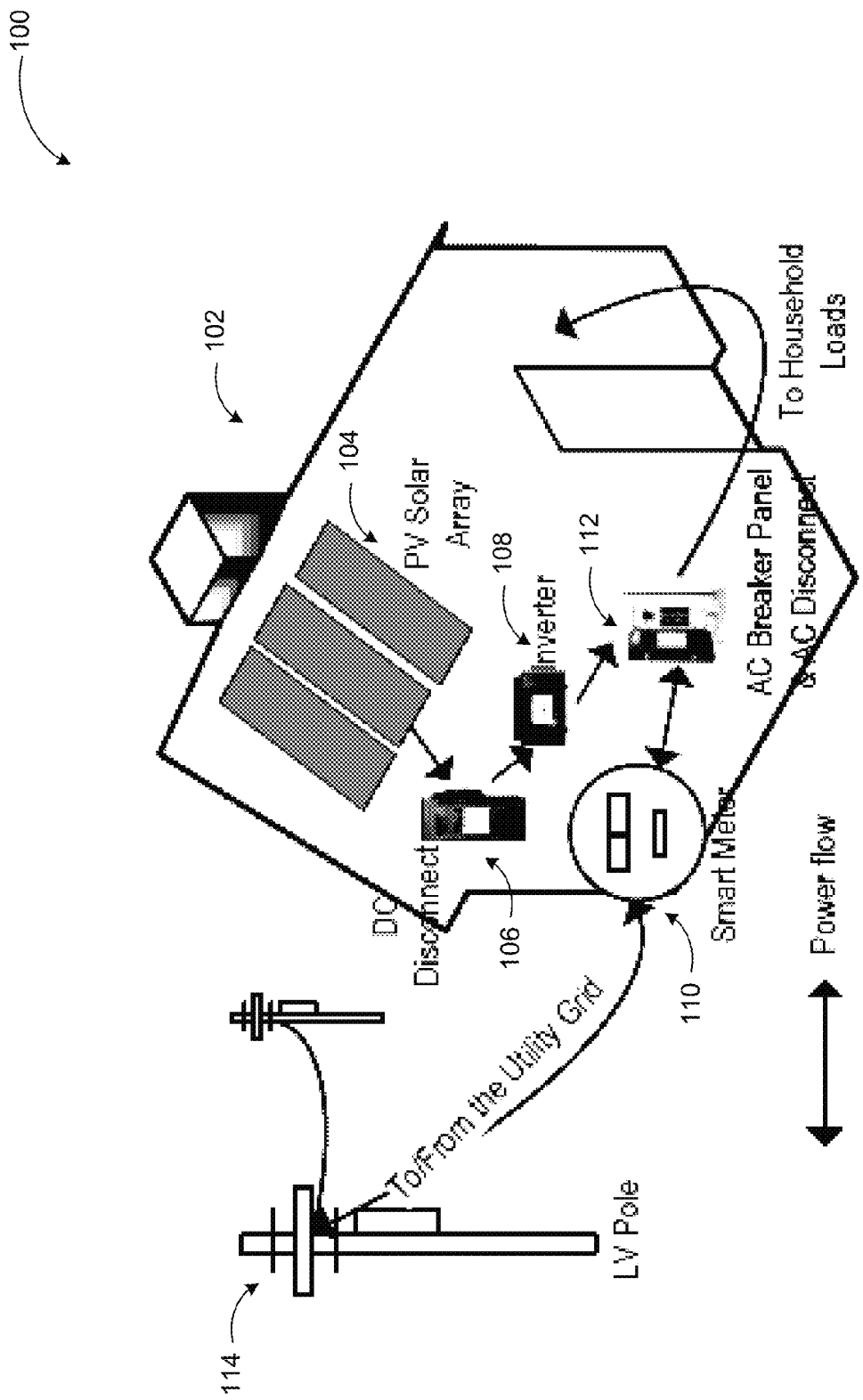
FIG. 1 illustrates an example household with a grid-tie solar power generation system mounted on rooftop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to alleviating solar power congestion in distribution grid via smart metering communications.

Briefly stated, technologies are generally provided for alleviating solar power congestion in a distribution grid via smart metering communications. According to some examples, a power network system supervised by utility operators may monitor and control grid-tied power generation modules associated with consumers to ensure the distribution grid is stable in terms of network capacity limit. A communications infrastructure including home area networks (HANs) and neighborhood area networks (NANs) between smart meters and utility control centers may facilitate power congestion management. Utility control centers (UCCs) in cooperation with smart meters or energy management units (EMUs) may selectively disconnect consumer power generation units to maintain the system reliability.

FIG. 1 illustrates an example household with a grid-tie solar power generation system mounted on rooftop, arranged in accordance with at least some embodiments described herein.

Diagram 100 in FIG. 1 includes a house 102 with photo-voltaic solar array 104, a direct current (DC) disconnect module 106, an inverter module 108, a smart meter 110, and an alternating current (AC) breaker panel and AC disconnect (ACBP&ACD) module 112. Utility pole 114 in diagram 100 represents the power grid connecting to the house 102. While diagram 100 (and diagram 200 in FIG. 2) shows the house 102, embodiments are not limited to houses or residential electricity consumers. Embodiments may also be implemented with commercial establishments or other larger size electricity consumers (e.g., schools, hospitals, etc.), which are generally referred to as units by utilities. As shown in FIG. 1, utility pole 114 is coupled to smart meter 110, which is coupled to the ACBP&ACD module 112. The photo-voltaic solar array 104 is coupled to the DC disconnect module 106, which is coupled to the inverter module 108. The inverter module 108 is coupled to the ACBP&ACD module 112.

In diagram 100, the photo-voltaic solar array 104 represents an on-location power generation system, which may alternatively be a wind-based power generation system, a biomass power generation system, and/or other power generation systems. The photo-voltaic solar array 104 may be operated for power consumption by the household and/or power contribution to the grid.

When emergency or maintenance on the utility grid system takes place, utility operators may need to ensure that the household power generation system is isolated from the grid so that utility crews are protected while performing their work. Furthermore, there may be times when power demands of the grid do not justify receiving power generated by the house 102. On-location generated (e.g., solar) power may be prevented from flowing to the grid by actuating a switch at the DC disconnect module 106 entirely to isolate the generated power from the solar panels. Alternatively, the on-location generated power may be prevent from flowing to the grid by switching off the power line between the ACBP&ACD module 112 and the utility grid at the ACBP&ACD module 112. The actuation of the DC disconnect module 106 may result in a less desirable power use because house 102 may be prevented from consuming the on-location generated power. In contrast, actuation of the ACBP&ACD module 112 may allow the house 102 to continuously consume their on-location generated power even though the house 102 is effectively cut off from the grid.

Figure 2:
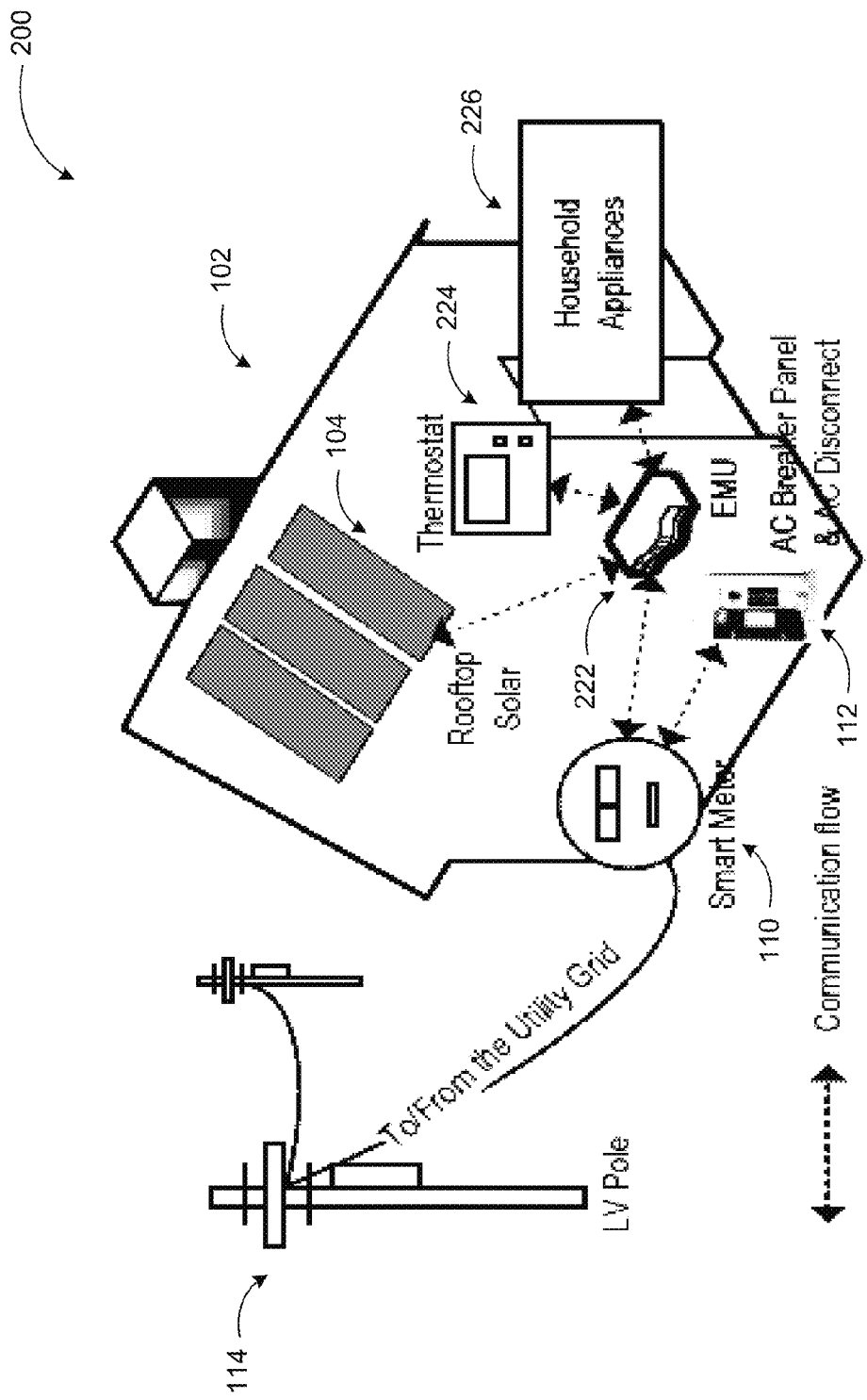
FIG. 2 illustrates example communications in a home area network (HAN) between a smart meter and an energy management unit (EMU) as well as between the EMU and a solar unit, appliances, and a thermostat.

FIG. 2 illustrates example communications in a home area network (HAN) between a smart meter and an energy management unit (EMU) as well as between the EMU and a solar unit, appliances, and a thermostat, arranged in accordance with at least some embodiments described herein.

Diagram 200 includes elements similar to diagram 100 such as the house 102 with photo-voltaic solar array 104, the smart meter 110, and the ACBP&ACD module 112. Utility pole 114 in diagram 200 also represents the power grid connecting to the house 102. House 102 in diagram 200 additionally includes EMU 222, thermostat 224, and household appliances 226. As shown in FIG. 2, utility pole 114 representing the power grid is coupled to smart meter 110, which is coupled to the ACBP&ACD module 112 and the EMU 222. The photo-voltaic solar array 104 is also coupled to the EMU 222 along with the thermostat 224 and the household appliances 226.

To alleviate on-location generated power congestion in a distribution grid via smart metering communications, the power network system may monitor and control grid-tied power generation modules associated with consumers through HANs in individual households and Neighborhood Area Networks (NANs) between smart meters and utility control centers as discussed below in conjunction with FIG. 3. Smart metering communications (SMC) may employ wired or wireless communications based on a proprietary or standard protocol such as IEEE 802.15.4 standard in HAN. The communication protocol may be selected to provide reasonable data rates for small-size data packets with low power transmission while taking into account factors such as RF penetration and less interference.

The HAN may be composed of several components as shown in diagram 200. The smart meter 110 may have multiple built-in functionalities supporting different wired and wireless communications protocols of power line communications and RF technologies, for example. In other examples, a separate communication modem (wired or wireless) may be used to facilitate communications with the utility control center (UCC). The photo-voltaic solar array 104 may have sensors embedded in the inverter for collecting data of the module status (not shown). The household appliances 226 may be embedded with sensors and/or intelligent electronic devices to generate power consumption data, which may be communicated to the EMU 222. The thermostat 224 may perform Heating, Ventilating, and Air Conditioning (HVAC)

control with communication capability. The EMU 222 may play the role of an intermediate node (e.g., a gateway), which may coordinate the household's power consumption via appliances and thermostat, and record solar power generation. The smart meter may further measure and record both solar power generation/surplus and household's power consumption. The smart meter may send signals to one or more switches (e.g., ACBP&ACD module 112 in diagram 100) directly or via the EMU 222 when disconnection/reconnection of the household power circuit from/to the grid is decided.

Figure 3:
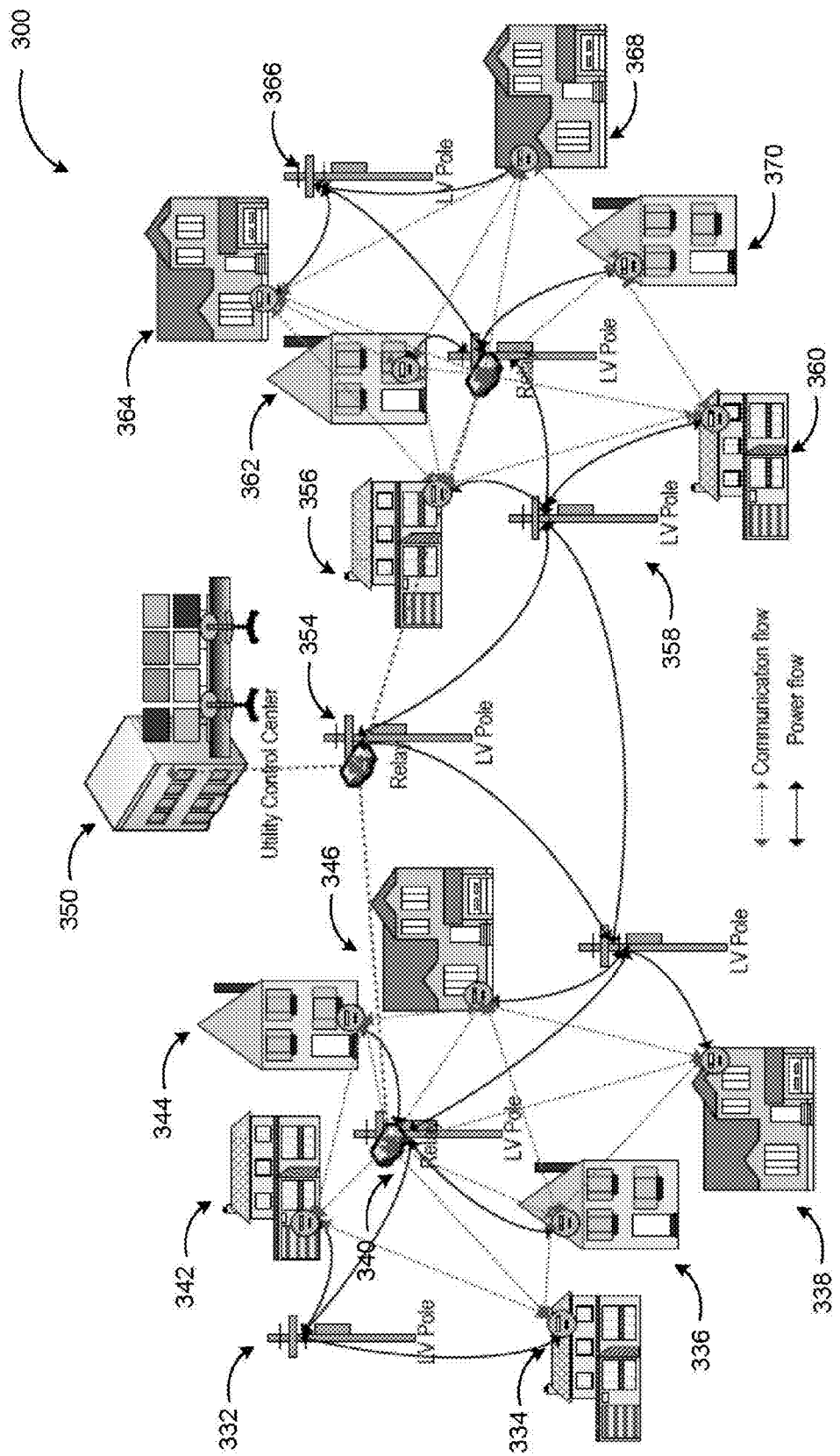
FIG. 3 illustrates an example smart metering communications infrastructure in a neighborhood area network (NAN)

FIG. 3 illustrates an example smart metering communications infrastructure in a neighborhood area network (NAN), arranged in accordance with at least some embodiments described herein.

Diagram 300 includes households 334, 336, 338, 342, 344, 346, 356, 360, 362, 364, 368, and 370, each with their corresponding smart meters. The households may be connected to a utility control center (UCC) 350 via a grid of power lines. The grid may include poles 332, 340, 354, 358, and 366. Some or all of the poles may include communication relays on them such that communication flow between the smart meters of the individual households and the UCC 350 can be facilitated via the power lines. In other examples, the communication may be facilitated through other networks such as a wireless wide area network, a cellular network, public switched telephone network (PSTN), Digital Subscriber Lines (DSLs), or combinations thereof.

The framework for data exchange between the smart meters and the UCC 350 may be developed using proprietary or standard protocols such as IEEE 802.15.4 and IEEE 802.11. In some example embodiments, the SMC may be constructed as a wireless mesh network. In electric power systems, power flow analysis may be used to schedule and plan for the amount of power flows between buses of the interconnected system. Available Transfer Capability (ATC) in power flow analysis may be used as a threshold value to determine whether or not the system is congested. ATC may be available already at the UCC 350. The smart meters may transmit energy profiles of their respective households to the UCC 350 periodically or on-demand depending on the utility operation. The transmission may also be dynamically scheduled based on time of day (e.g., more frequently around high-consumption times and less frequently around low-consumption times). Once congestion is detected by the UCC 350 (e.g., above the ATC threshold) in the power network, the UCC 350 may send notification signal packets to specific smart meters in accordance with the below described selection schemes to isolate the associated solar units from the grid. Reconnection of the household to the grid may be performed either when grid power is requested by the household or after congestion is resolved.

Algorithm 1 is an example pseudo-algorithm summarizing a system model according to some example embodiments:

---

Ensure transmission of energy profiles from smart meters to UCC at the UCC;
    while power congestion is detected by UCC do;
        if a unit has no surplus then;
            allow the unit to remain on the grid (by instructions from UCC);
        else (a surplus exists);
            send notification from the UCC to units to be disconnected, where disconnected units stay in islanded / standby modes -continued grant reconnection to a unit from the UCC when grid power is needed or congestion is removed;
    end if;
end while

---

To formulate an expression for the system model, N households with on-location power generation systems may be considered in a neighborhood. Each household, n (where n=1 ... N) may consume energy in Watt per hour (Wh) during on-location (e.g., solar) power generation. The corresponding demand value may be represented by a nonnegative integer and denoted as $P_{D,n} \in \mathbb{Z}$ $|P_{D,n} \geq 0$. Power surplus from the solar power generation system $x_n$ may exit when generated power in Wh is (less) more than it is needed. The corresponding surplus value may be an integer and denoted as $P_{S,n} \in \mathbb{Z}$. In the selection process of disconnection, $\hat{N}=N\backslash M$ households may be considered with N being the number of households with on-location power generation systems and M being the number of households that do not have surplus power and have to remain connected to the grid. The capacity of the distribution line may be a nonnegative integer and denoted as $P_{ATC} \in \mathbb{Z}$ $|P_{ATC} \geq 0$.

A desired number of solar power generation systems connected to the grid may be determined such that the number of units remaining in the grid is approximately maximized, subject to the constraint that the network is not overloaded. To achieve the goal, the total power surplus value may be determined as:

$$\max \sum_{n \in N} x_n \quad [1]$$

$$\text{s.t.} \sum_{n \in N} P_{S,n} \cdot x_n \leq P_{ATC},$$

$$x_n \in \{0, 1\}$$

In the determination, a 0/1 knapsack problem may be considered, where $x_n=0$ if unit n is scheduled to be off the grid and $x_n=1$ to be on the grid. At the same time, the total power demand value may also be determined as:

$$\max \sum_{n \in N} P_{D,n} \cdot x_n \quad [2]$$

$$\text{s.t.} \sum_{n \in N} P_{S,n} \cdot x_n \leq P_{ATC},$$

$$x_n \in \{0, 1\}$$

A selection approach according to example embodiments may tend to maximize the number of connected solar power generation systems for the following reasons: 1) the connected households may be able to provide power surpluses to the utility grid, 2) frequent disconnection and reconnection due to demand and surplus fluctuations may be avoided, and 3) the number of data packets exchange for disconnection and reconnection processes may be reduced. Additionally, optimization functions may protect households which use a significant amount of power with respect to a high energy efficiency value from being disconnected. The efficiency of power use of household n may be a nonnegative real number, and defined as the ratio of power demand to power surplus as:

$$\eta_n = \frac{P_{D,n}}{P_{S,n}} \in \mathbb{R} \mid \eta_n \geq 0 \, n \in \hat{N}. \qquad [3]$$

Meanwhile, households with lower efficiency of power use may be encouraged and prevent from being disconnected from the grid to utilize power during solar power generation.

FIGS. 4A through 4D illustrate conceptually some example algorithms that may be employed in selecting households to disconnect in case of power congestion, arranged in accordance with at least some embodiments described herein.

Smart grid communications may involve large amounts of data transmission and exchanges between the utility control center and smart meters. The efficiency of computation at the control center may influence the system performance. When the control center receives data from the smart meters about households' power consumption and solar power surpluses, it may have to quickly determine which ones among N households need to be disconnected from the grid once power congestion has arisen. Greedy approach with an average complexity of approximately O(n) may provide a sub-optimal result and may yet be much less time consuming for computation.

One greedy approach to the above-discussed knapsack problem may include ordering the units. According to some examples, selecting the candidates among households may be based on following three techniques: the highest power demand first (i.e., Non-Increasing power Demand "NID"), the greatest power efficiency first (i.e., Non-Increasing power Efficiency "NIE"), and the lowest power surplus first (i.e., Non-Decreasing power Surplus or "NDS"). NDS may tend to select as many units as possible because it accumulates surplus values in ascending order:

$$P_{S,1} \leq P_{S,2} \leq \ldots \leq P_{S,n} \mid n \in \hat{N} \qquad [4]$$

The NDS strategy may fulfill the first optimization, i.e., maximization of the number of connected units in Eq. [1]. In other example embodiments, NDS may be combined with NIE to enhance the overall efficiency and demand so that the second optimization is also achieved, i.e., Eq. [2]. It should be noted a unit beginning with the smallest surplus may be reasonably selected because its energy efficiency is likely high. However, in the case where a unit with a small surplus is due to a small amount of generation, its energy efficiency may be low if the demand is small.

Modified NDS (MNDS) Approach

An assumption may be made that data information about solar power demand and surplus of N households are collected from the smart meters and available at the utility control center. $\hat{N}$ units may be considered when other M units do not have surplus available. Units in $\hat{N}$ may be disconnected while the network is overloaded. The overload status of the network may be found by subtracting the capacity limit by the total surplus of $\hat{N}$ units:

$$P_O = \sum_{n \in \hat{N}} P_{S,n} - P_{ATC}, \qquad [5]$$

where $P_O$ is the overload power.

The NDS scheme may be performed when overload is detected, i.e., $P_O > 0$. Units may be selected based on their surpluses in an ascending order, for example. After executing the algorithm (e.g., algorithm 2 below), the greedy operation may stop at iteration i.

Algorithm 2. Modified NDS

```
1:  Determine if the capacity is overloaded (Eq. 6)
2:  if P_o ≤ 0 then
3:      Disconnect none
4:  else
5:      Sort surpluses in ascending order
6:      if P_ATC > the min surplus among N̂ units then
7:          c = P_ATC
8:          for i = 1 to N̂ do
9:              if P_S,i ≤ 0 then
10:                 c = c - P_S,i  [Keep unit i ON]
11:             else
12:                 No more units can be accommodated
13:                 s = i
14:                 Break
15:             end if
16:         end for
17:         w = s - 1
18:         Calculate the overflowed power P_E (Eq. 8)
19:         for j = 1 to w do
20:             Find candidate(s) in x̂_l
21:             if P_E ≤ P_S,j then
22:                 One in x̂_l among units j-(s - 1) with min η
                    is the candidate η_l of unit l
23:                 for k = s + 1 to N̂ do
24:                     Find candidate(s) in x̂_r
25:                     if P_S,k - P_S,j > P_S,l - P_E then
26:                         One in x̂_r among units s-(k - 1)
                            with max η is the candidate η_r of
                            unit r
27:                         if η_l < η_r then
28:                             Unit l is substituted by unit r
29:                             end if[Nothing changed otherwise]
30:                         Break
31:                     end if
32:                 end for
33:                 Break
34:             end if
35:         end for
36:     end if{Disconnect all otherwise}
37: end if
``` where an overload of the capacity may be found as:

$$\Sigma_{n=1}^{s-1} P_{S,n} \leq P_{ATC} \text{ and } \Sigma_{n=1}^{s} P_{S,n} > P_{ATC} n \in \hat{N} \qquad [6]$$

It should be noted that the surplus power of unit s (e.g., at iteration i), $P_{S,s}$, may not be accepted because it may violate Eq. [5]. The symbol s may be assigned to be the split unit, which constitutes the solution vector $\hat{x}$ with $\hat{x}_n = 1$ for n=1, 2, ..., s-1 and $\hat{x}_n = 0$ for n=s, s+1, ..., $\hat{N}$:

$$\hat{x} = \begin{bmatrix} \hat{x}_1 & \hat{x}_2 & \ldots & \hat{x}_{s-1} & \hat{x}_s & \hat{x}_{s+1} & \ldots & \hat{x}_{\hat{N}} \\ \underbrace{1 \quad 1 \quad \ldots \quad 1}_{\hat{x}_l} & & & \underbrace{0 \quad 0 \quad \ldots \quad 0}_{\hat{x}_r} & & \end{bmatrix} \qquad [7]$$

$P_{S,s}$ may be defined as the split surplus power value. The exceeded power capacity, when the split surplus value is added, may be computed as:

$$P_E = \Sigma_{n=1}^{s} P_{S,n} - P_{ATC} n \in \hat{N} \qquad [8]$$

Figure 4:
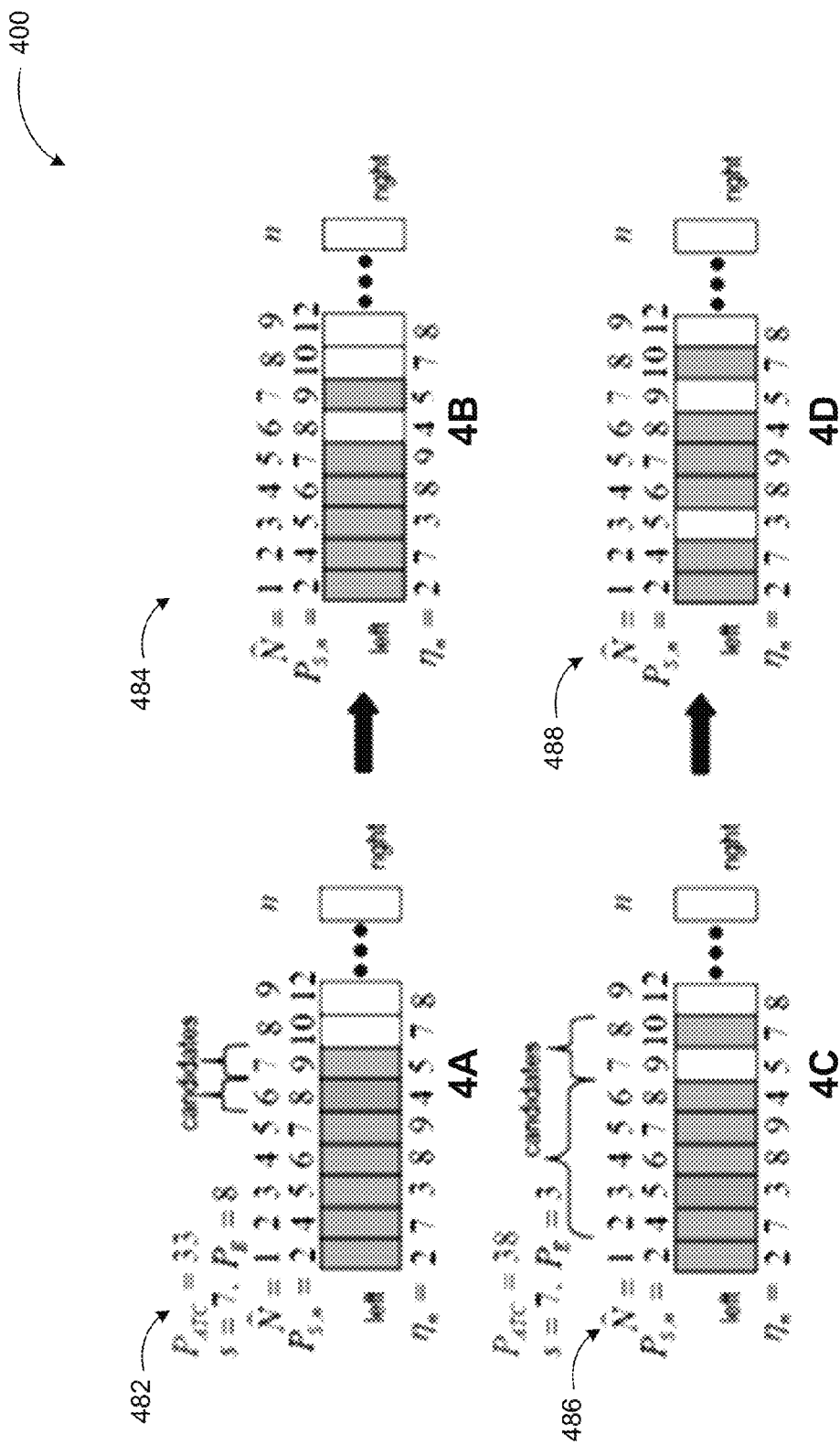
FIGS. 4A through 4D illustrate conceptually some example algorithms that may be employed in selecting households to disconnect in case of power congestion.

Diagram 400 shows two example conditions employing the MNDS algorithm (respectively, illustrations 482 in FIG. 4A, 484 in FIGS. 4B and 486 in FIG. 4C, 488 in FIG. 4D). Two situations during the substitution are shown, where 484 and 486 depict one candidate found in $\hat{x}_l$ and $\hat{x}_r$, respectively; and 486 and 488 demonstrate multiple candidates found in $\hat{x}_l$ and $\hat{x}_r$, respectively.

According to a first example condition, $P_{ATC}$ may be determined at the UCC (e.g., 33 pu shown in illustrations 482 in FIG. 4A, 484 in FIG. 4B) and energy profiles of the households may be collected and sorted in ascending order of surplus power values at a specific time. "pu" refers to power unit, which may be kW, W, or a normalized value of power. Unit 7 may be found to be the split unit (whose surplus value is 9) while the first six units have an aggregate of surplus values of 32. Adding the split surplus value would make the total 41 and result in overload. While knowing $P_E=8$ derived from Eq. [8], unit 6 whose surplus value is 8 may be determined to be the one candidate in $\hat{x}_l$. Subsequently, the outcome of searching for candidates in $\hat{x}_r$ may be unit 7. As a result, unit 6 may be removed from the list and unit 7 which has higher energy efficiency may be added without exceeding the capacity limit, $\Sigma_{n=1}^{5} P_{S,n}+P_{S,7}=33 \leq P_{ATC}$.

In another situation where more than one unit may be found in $\hat{x}_l$ and $\hat{x}_r$, $P_{ATC}=38$ may be determined at the UCC as shown in FIGS. 4C and 4D. The split unit may be unit 7 again and $P_E=3$ may be derived, implying that any surplus values larger than or equal to 3 in $\hat{x}_l$ are qualified for substitution (i.e., units 2-6). While unit 3 whose surplus value is 5 may happen to have the lowest efficiency value among others, the units in $\hat{x}_r$ that satisfy the surplus condition may be determined by subtracting $P_E$ by $P_{S,3}$ (i.e., 5−3=2 according to the example values) and by subtracting $P_{S,7}$ by $P_{S,9}$ (i.e., 12−9=3 according to the example values). The outcome shows the candidates in $\hat{x}_r$ to be unit 7 and unit 8. As a result, unit 3 may be substituted by unit 8 whose energy efficiency is higher than that of unit 7 and unit 3, without exceeding the capacity limit, $\Sigma_{n=1}^{2} P_{S,n}+\Sigma_{n=4}^{6} P_{S,n}+P_{S,8}=37 \leq P_{ATC}$. While the one-to-one substitution may preserve as many units as NDS can, MNDS may outperform NDS in greater energy efficiency once an available substitute is found.

The MNDS scheme may approximately take n log(n) executions in the average and worst cases. Accumulation of surplus values may take (1+1)+[n(1+1)+1] executions while determining the overload status and calculating $P_E$ may take n+1 executions each. Since the MNDS searches for candidates in both $\hat{x}_l$ and $\hat{x}_r$, which may take n executions each, as well as comparing the final candidate in $\hat{x}_l$ with the final candidate in $\hat{x}_r$ that takes 2 executions, an overall complexity of MNDS may be asymptotically reduced to O(n log(n)).

Diagram 500 including FIGS. 5A through 5D is an illustration of the RVS algorithm, arranged in accordance with at least some embodiments described herein.

Reverse Selection (RVS) Approach

Differently from the MNDS approach, the reverse selection approach may select units to be disconnected instead of selecting units to be connected first since the number of disconnected units is likely to be less than $\hat{N}/2$. The approach may sort the energy profiles in descending order of surplus values.

In RVS approach, the assumption may be made that data information about demands and surpluses are received at the UCC. Whether the network is overloaded may be identified by executing Eq. [5]. If overload is observed (i.e., $P_O>0$), the deselection process may begin. The permutation may be constructed by sorting the surplus values of units in descending order that is contrary to NDS and MNDS. When multiple iterations are needed to deselect units during the process (e.g., when the updated overload value is larger than the greatest surplus value), an arbitrary number, κ, of units from the first unit may be inspected and one unit that has the lowest energy efficiency may be selected. The parameter κ may be an adjustable number which defines the inspection range in the RVS scheme, where κ=1, 2, ..., $\hat{N}$.

The example algorithm below shows one way of determining units to be disconnected from the grid according to the RVS approach:

| Algorithm 3 Reverse Selection Algorithm |
| --- |
| 1:  if $P_{ATC}$ < the min surplus among $\hat{N}$ units then |
| 2:      Disconnect all units |
| 3:  else |
| 4:      Sort surpluses in descending order |
| 5:      Pick $r_\kappa$ |
| 6:      for j = 1 to $\hat{N}$ do |
| 7:         if $P_O < P_{S,\hat{N}}$ then |
| 8:            if $P_O \leq 0$ then |
| 9:               Break {Disconnect none} |
| 10:          else |
| 11:             Disconnect one with min η among the last κ units (see FIG. 6(d)) |
| 12:             Break |
| 13:         end if |
| 14:        else |
| 15:           if $P_O \leq P_{S,1}$ then |
| 16:              if $P_O > P_{S,2}$ then |
| 17:                 Disconnect the first unit (see FIG. 6(c)) |
| 18:                 Break |
| 19:              else {see FIG. 6(b)} |
| 20:                 Disconnect one with min η among units 1−(i − 1) such that $P_O > P_{S,i}$ |
| 21:                 Break |
| 22:            end if |
| 23:           else {Next round is required; see FIG. 6(a)} |
| 24:              Disconnect one with min η among units 1−κ |
| 25:         end if |
| 26:      end if |
| 27:      end for |
| 28:  end if |

Figure 5:
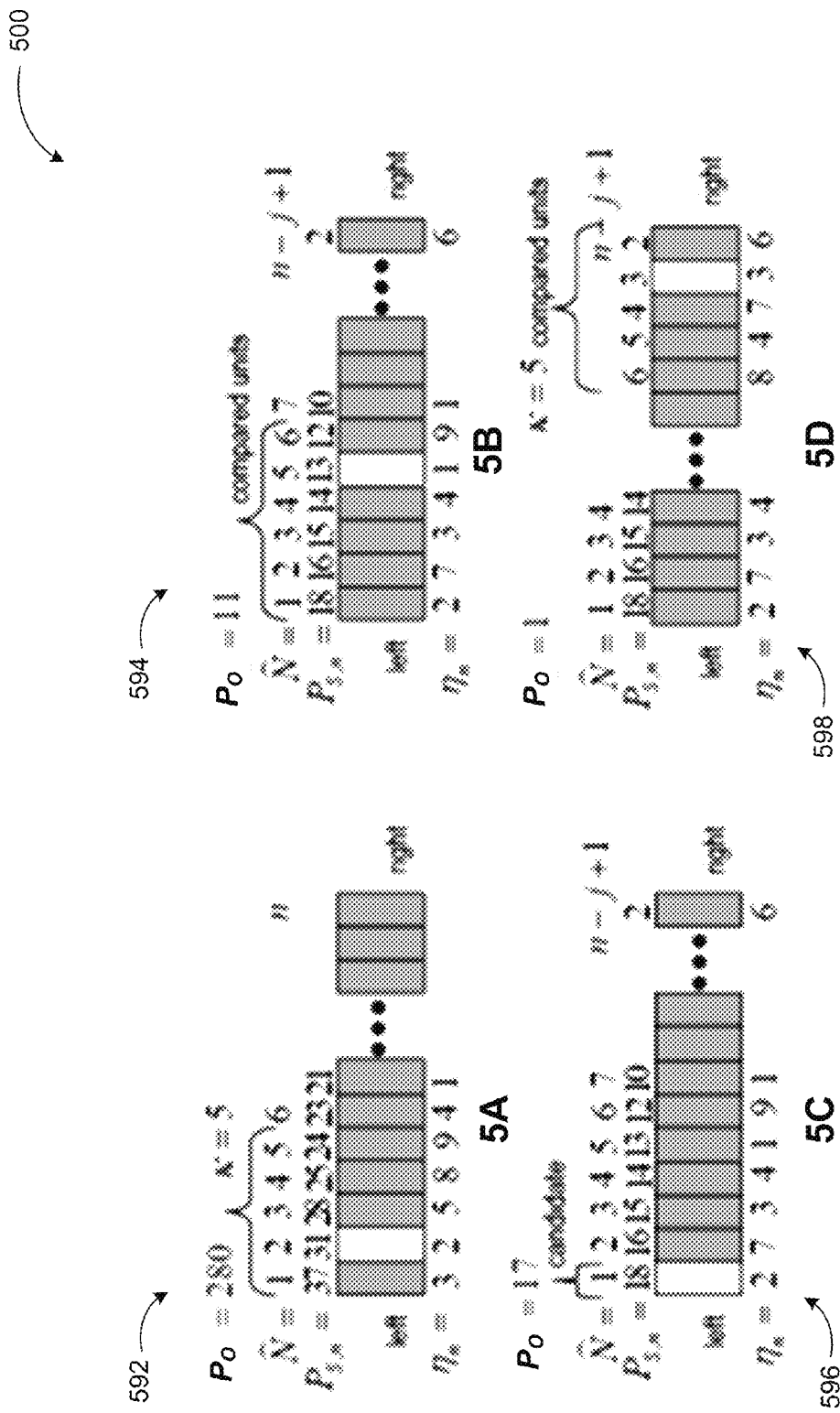
FIGS. 5A through 5D illustrate conceptually further example algorithms that may be employed in selecting households to disconnect in case of power congestion.

Four example situations during the deselection process are shown in FIGS. 5A through 5D, where illustrations 592 (FIG. 5A) depicts the first five units being compared during the first j−1 iterations, while illustrations 594 (FIG. 5B), 596 (FIG. 5C), and 598 (FIG. 5D) demonstrate the last iteration j being performed; FIG. 5B depicts a comparison among the first six units; FIG. 5C depicts the first unit being deselected when it is the only one that satisfies the condition; and FIG. 5D depicts a comparison among the last five units.

Assuming an example value of $P_O=280$ shown in FIG. 5A, one iteration of deselecting a unit may not be enough to fulfill the capacity constraint. In this situation, the first five surplus values of units may be compared to each other and unit 2 deselected in order to maintain high energy efficiency. Notably, picking a large κ may increase the overall energy efficiency and demand at the cost of a smaller U as compared to NDS and MNDS, where the outcome of RVS may approach that of NIE. It should also be noted that when κ=0, the outcome of RVS may be identical to that of NDS in reverse. The recursion may continue until the residual overload at iteration j is found either larger than or smaller than the surplus value of the last unit, unit $\hat{N}$−j+1. Both cases may indicate one more unit to be deselected. In the first case, the overload value may be compared with the surpluses starting from the first unit until it is found greater than the $i^{th}$ surplus. Since the first i−1 surpluses are larger than the overload value, one of them with the least energy efficiency may be selected for disconnection.

In the example scenario of FIG. 5B, $P_O=11$ may be assumed, and units before unit 7 (units 1-6) may need a comparison of their energy efficiencies. As a result, unit 5 may be deselected. In the example scenario of FIG. 6C where $P_O=17$, unit 1 with surplus value being larger than the overload value may be directly deselected without a comparison. On the other hand, the latter case (the residual overload at iteration j being found smaller than the surplus value of the last unit) may apply the same method for the recursive iterations such that the last κ units are compared, and one of them with the minimum energy efficiency is selected for disconnection. In FIG. 5D, $P_O=1$ is selected as example value, where unit n−j with a surplus value is 3 may be deselected among the last five units.

The RVS algorithm also involves the sorting process which may take n log(n)+1+1 executions. Since the complexity of RVS is dominated by the first j−1 iterations, the complexity of the last iteration j may be neglected (max{1,1+κ,1+1,1+i−1}). In a worst case scenario, the first j−1 iterations may take approximately n(1+1+κ)~$n^2$ executions if κ=n. However, the purpose of RVS is to enhance the overall efficiency while preserving as large U as possible; κ may be selected to be small so that the overall complexity of RVS may still be asymptotically reduced to O(n log(n)).

Figure 6:
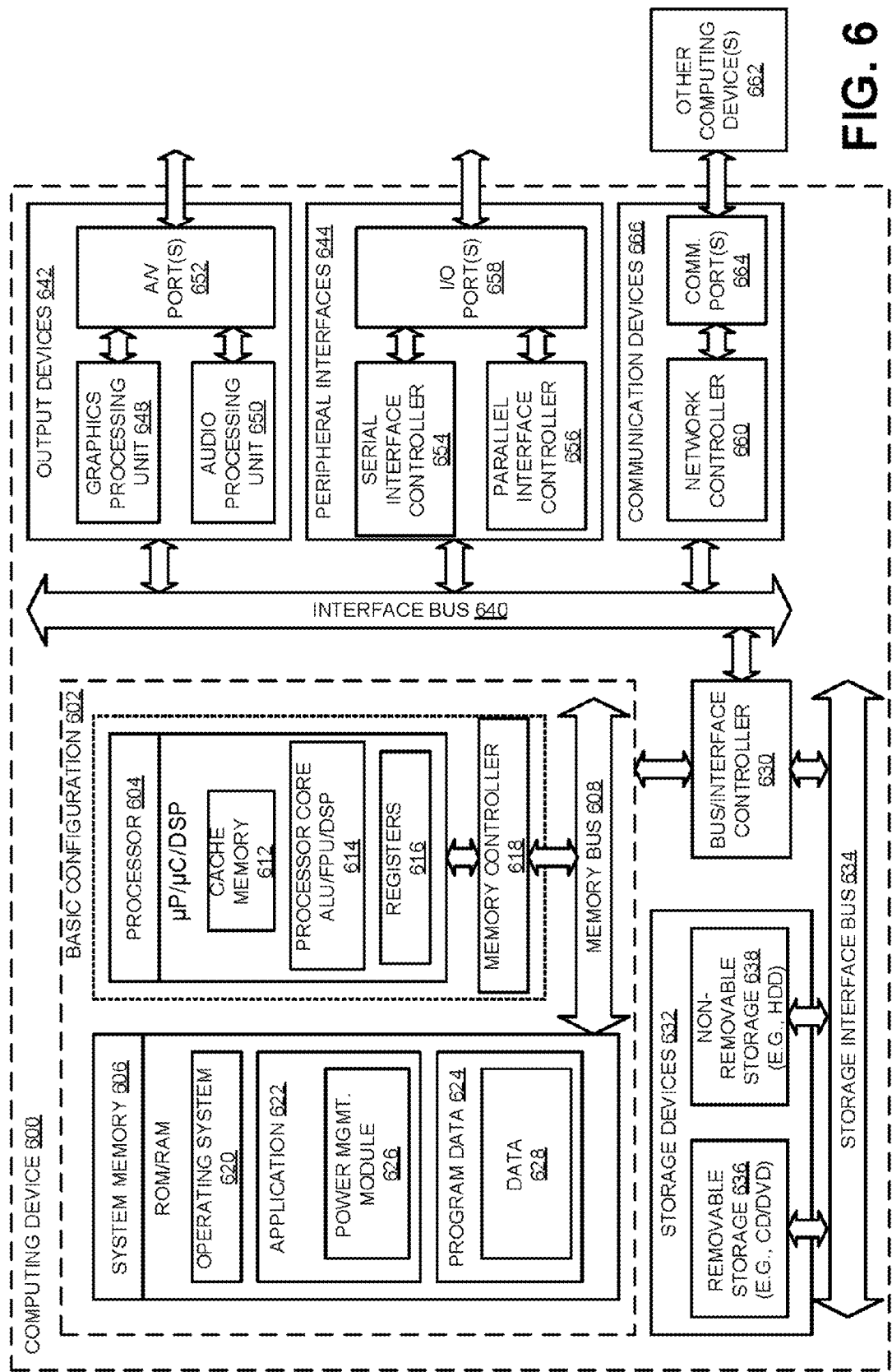
FIG. 6 illustrates a general purpose computing device, which may be used to manage alleviation of solar power congestion in distribution grid via smart metering communications.

FIG. 6 illustrates a general purpose computing device, which may be used to manage alleviation of solar power congestion in distribution grid via smart metering communications, arranged in accordance with at least some embodiments described herein.

For example, the computing device 600 may be used as a server, desktop computer, portable computer, smart phone, special purpose computer, or similar device such as the smart meter 110 of FIG. 1 or the EMU 222 of FIG. 2. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, one or more applications 622, and program data 624. The application 622 may include a power management module 626, which may be an integral part of the application 622 or a separate application on its own. The power management module 626 may coordinate selective disconnection of consumer power generation units with a UCC to maintain the system reliability, as described herein. The program data 624 may include, among other data, data 628 related to power consumption, power generation, acceptable prices for received or sold power, or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods for maintaining application performances upon transfer between cloud servers. These methods can be implemented in any number of ways, including the structures described herein.

One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
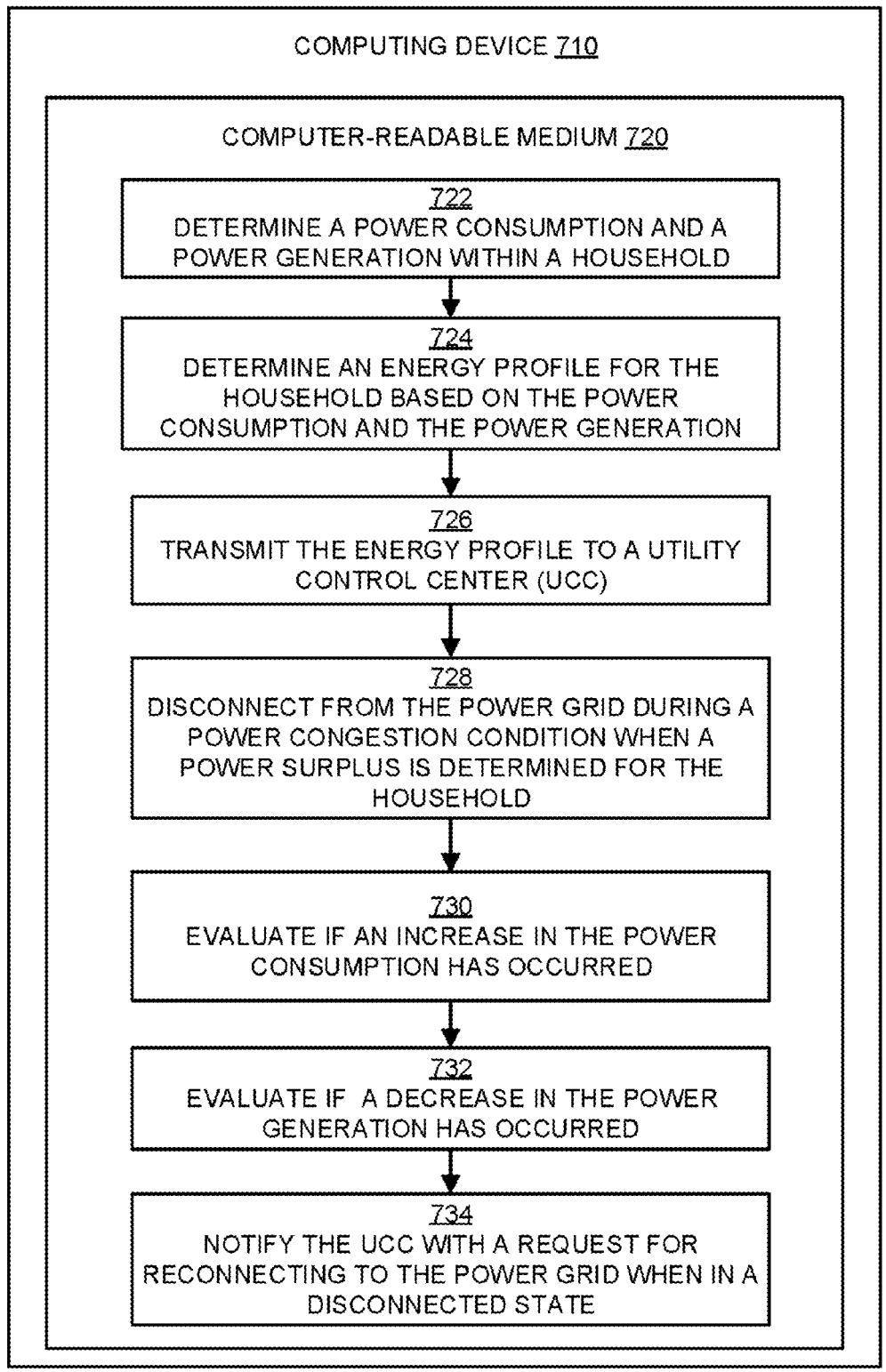
FIG. 7 is a flow diagram illustrating an example method that may be performed by a computing device such as the computing device in FIG. 6.

FIG. 7 is a flow diagram illustrating an example method that may be performed by a computing device such as the computing device in FIG. 7, arranged in accordance with at least some embodiments described herein.

Example methods may include one or more operations, functions or actions as illustrated by one or more of blocks 722, 724, 726, 728, 730, 732, and/or 734. The operations described in the blocks 722 through 734 may also be stored as computer-executable instructions in a computer-readable medium such as a computer-readable medium 720 of a computing device 710.

An example process for alleviating solar power congestion in a distribution grid via smart metering communications may begin with block 722, "DETERMINE A POWER CONSUMPTION AND A POWER GENERATION WITHIN A HOUSEHOLD", where a power management device, for example, the smart meter 110 of FIG. 1 or the EMU 222 of FIG. 2 may determine a power consumption and a power generation within a household through communication with a power generation system and one or more household appliances over a home area network (HAN). The determined power generation and consumption may be instantaneous, average per hour, over different times of day, days of week, etc. The EMU 222 may collect data from appliances and determine total household consumption. Alternatively, it may determine consumption from the smart meter 110, from inverter 108, etc.

Block 722 may be followed by block 724, "DETERMINE AN ENERGY PROFILE FOR THE HOUSEHOLD BASED ON THE POWER CONSUMPTION AND THE POWER GENERATION", where the smart meter 110 of FIG. 1 or the EMU 222 of FIG. 2 may compute an energy profile for the household. The energy profile may indicate when the household has power surplus and when it needs power from the grid, which may be instantaneous, average per hour, over different times of day, days of week, etc.

Block 724 may be followed by block 726, "TRANSMIT THE ENERGY PROFILE TO A UTILITY CONTROL CENTER (UCC)", where the smart meter 110 of FIG. 1 may transmit the energy profile to a utility control center (UCC) directly or through a communication network such as a neighborhood area network (NAN). The UCC may make a decision on which households to disconnect from the grid based on the energy profile information received from multiple households.

Block 726 may be followed by block 728, "DISCONNECT FROM THE POWER GRID DURING A POWER CONGESTION CONDITION WHEN A POWER SURPLUS IS DETERMINED FOR THE HOUSEHOLD", where the smart meter 110 of FIG. 1 may disconnect the household from the power grid through an ACBP&ACD 112 upon receiving an instruction to disconnect from the UCC.

Block 728 may be followed by block 730, "EVALUATE IF AN INCREASE IN THE POWER CONSUMPTION HAS OCCURRED", where the smart meter 110 of FIG. 1 or the EMU 222 of FIG. 2 may determine whether the power consumption of the household is higher than before such that the household may have a net power need from the grid.

Block 730 may be followed by block 732, "EVALUATE IF A DECREASE IN THE POWER GENERATION HAS OCCURRED", where the smart meter 110 of FIG. 1 or the EMU 222 of FIG. 2 may determine whether the power generation of the household has decreased such that the household may have a net power need from the grid.

Block 730 and/or block 732 may be followed by block 734, "NOTIFY THE UCC WITH A REQUEST FOR RECONNECTING TO THE POWER GRID WHEN IN A DISCONNECTED STATE", where upon determining the need for power from the power grid, the smart meter 110 of FIG. 1 or the EMU 222 of FIG. 2 may communicate with the UCC and ask to reconnect to the grid for receiving power.

The blocks included in the above described process are for illustration purposes. Alleviating solar power congestion in a distribution grid via smart metering communications may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, a power management module 626 executed on the processor 604 may undertake one or more of the tasks shown in FIG. 8 in response to the instructions 804 conveyed to the processor 604 by the medium 802 to perform actions associated with alleviating solar power congestion in a distribution grid via smart metering communications as described herein. Some of those instructions may include, for example, instructions for determining a power consumption and a power generation within a household; determining an energy profile for the household based on the power consumption and the power generation; transmitting the energy profile to a utility control center (UCC); disconnecting from the power grid during a power congestion condition when a power surplus is determined for the household; evaluating if one or more of an increase in the power consumption and/or a decrease in the power generation has occurred; and/or notifying the UCC with a request for reconnecting to the power grid in a disconnected state according to some embodiments described herein.

In some implementations, the signal bearing medium 802 depicted in FIG. 8 may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 604 of FIG. 6 by an RF signal bearing medium, where the signal bearing medium 802 is conveyed by the wireless communications medium 810 (e.g., a wireless communications medium conforming with the IEEE 802.11 standard).

According to some example embodiments, various methods for managing power congestion conditions in a power grid through smart metering communications (SMC) are described. Example methods may include receiving energy profile information from a smart meter and/or during a power congestion condition evaluating the received energy profile information to determine if the unit has surplus power. The smart meter may be associated with a unit, and the method may further include instructing the smart meter to disconnect from the grid and transitioning the smart meter into one of an islanded mode or a standby mode when the unit is determined to have power surplus.

According to other examples, the method may also include detecting that the power congestion has expired and instructing the disconnected smart meter to reconnect to the grid upon detection of the expiration of the power congestion. The method may further include detecting that a need for grid power at the unit and instructing the disconnected smart meter to reconnect to the grid upon detection of the a need for grid power. Receiving energy profile information may further include receiving the energy profile information periodically from the smart meter. The method may further include selecting the period dynamically based on one or more of a utility operation, a time of day, and/or a day of week, and receiving the energy profile at predetermined times in the morning, in the afternoon, and in the evening of each day.

According to further examples, the method may also include communicating with a plurality of smart meters through a neighborhood area network (NAN) and communicating with the plurality of smart meters via one of a wired communication and/or a wireless communication. Determining the power congestion condition may include determining the power congestion condition from the received energy profiles based on a predefined threshold for Available Transfer Capacity (ATC), where the ATC is computed as: ATC=TTC−TRM−ETC, where TTC is Total Transfer Capability that defines an amount of power that can be transferred over the power grid in a reliable manner to satisfy security constraints, TRM is Transmission Reliability Margin that defines an amount of TTC to ensure security of the power grid under a predefined range of uncertainties in system conditions, and ETC is Existing Transmission Commitments that defines a retail customer service and a capacity benefit margin (CBM).

According to yet other examples, the method may further include determining the power congestion condition to satisfy one or more of a thermal limit, a voltage limit, and a stability limit as the security constraints. The method may also include determining which smart meters to disconnect based on determining $$\max \sum_{n \in \hat{N}} x_n$$

$$\text{s.t.} \sum_{n \in \hat{N}} P_{S,n} \cdot x_n \leq P_{ATC}, x_n \in \{0, 1\} \text{ and}$$

$$\max \sum_{n \in \hat{N}} P_{D,n} \cdot x_n$$

-continued $$\text{s.t.} \sum_{n \in \hat{N}} P_{S,n} \cdot x_n \leq P_{ATC}, x_n \in \{0, 1\}$$

where $P_{S,n}$ denotes surplus power value and $P_{D,n}$ denotes power demand value for each unit on the power grid with n=1 to N units on the power grid.

According to yet further examples, the method may further include determining a number of connected smart meters that can be achieved without exceeding a capacity constraint:

$$\sum_{n \in \hat{N}} P_{S,n} \cdot x_n \leq P_{ATC}, x_n \in \{0, 1\},$$

where $P_{ATC}$ denotes an ATC threshold power value. The method may also include assigning an energy efficiency to each unit on the power grid based on the received energy profile, where the energy profile includes at least a power generation capacity and a power consumption capacity of each unit. The method may include ranking assigned energy efficiencies of the units in a descending order, and/or determining which units to disconnect from the power grid based on the rank. The unit may be a residential household or a commercial facility.

According to some examples, the method may further include determining which units with power surplus to disconnect from the power grid based on comparing non-increasing power demand (NID) for the units, where the NID maximizes a total value of power demand disregarding associated power surplus by adding demand values in a ranked order of power demand from $P_{D,1}$ to $P_{D,n}$, where $P_{D,n}$ denotes power demand for $n^{th}$ unit. Alternatively, the method may include determining which units with power surplus to disconnect from the power grid based on comparing non-increasing power efficiency (NIE) for the units, where the NIE accumulates power demand values in a ranked order of energy efficiency from $\eta_1$ to $\eta_n$, where $\eta_n$ denotes energy efficiency for $n^{th}$ unit. The method may also include determining which units with power surplus to disconnect from the power grid based on comparing non-decreasing power surplus (NDS) for the units, where the NDS is configured to select as many units as possible while accumulating surplus values in a ranked order of surplus power from $P_{S,1}$ to $P_{S,n}$, where $P_{S,n}$ denotes surplus power for $n^{th}$ unit.

According to other example embodiments, various methods for managing unit power consumption in a smart power grid through smart metering communications (SMC) are described. Example methods may include determining, at an energy management unit (EMU), a power consumption and a power generation within a unit through communication with a power generation system and one or more appliances over a Home Area Network (HAN) and/or determining an energy profile for the unit based on the power consumption and the power generation. The method may also include transmitting the energy profile to a utility control center (UCC) and/or disconnecting the unit from the power grid upon receiving instructions from the UCC when the grid is in a power congestion condition.

According to some examples, the method may further include evaluating if an increase in the power consumption of the unit has occurred when in a disconnected state and notifying the UCC with a request for reconnecting to the power grid. The method may also include evaluating if a decrease in the power generation of the unit has occurred when in a disconnected state and notifying the UCC with a request for reconnecting to the power grid. Transmitting the energy profile to the UCC may include communicating with the UCC via one of the smart meter coupling the unit to the power grid or a communication modem within the HAN through a neighborhood area network (NAN). The method may also include transmitting the energy profile periodically to the UCC and/or selecting the period dynamically based on one or more of a utility operation, a time of day, and/or a day of week. Transmitting the energy profile may further include transmitting the energy profile at selected times in the morning, in the afternoon, and in the evening of each day.

According to further examples, determining the energy profile may further include monitoring the power consumption and the power generation within the unit through communicating with one or more a smart appliance, a thermostat, an AC disconnect unit, and/or the power generation system. The power generation system may include one or more of a solar power generation system, a wind power generation system, and/or a biomass power generation system. Determining the energy profile may also include determining the energy profile once each day and updating at selected times during each day or determining the energy profile periodically during each day. The instruction to disconnect may be received upon a disconnect decision made by the UCC based on a ranked order of energy efficiency of units on the power grid.

According to yet other examples, the instruction to disconnect may be received upon a disconnect decision made by the UCC based on one or more of: comparing non-increasing power demand (NID) for the units, where the NID maximizes a total value of power demand disregarding associated power surplus by adding demand values in descending order of power demand from $P_{D,1}$ to $P_{D,n}$, where $P_{D,n}$ denotes power demand for $n^{th}$ unit; comparing non-increasing power efficiency (NIE) for the units, where the NIE accumulates power demand values in descending order of energy efficiency from $\eta_1$ to $\eta_n$, where $\eta_n$ denotes energy efficiency for $n^{th}$ unit; and/or comparing non-decreasing power surplus (NDS) for the units, where the NDS is configured to select as many units as possible while accumulating surplus values in ascending order of surplus power from $P_{S,1}$ to $P_{S,n}$, where $P_{S,n}$ denotes surplus power for $n^{th}$ unit.

According to yet further examples, the method may include evaluating whether one of an increase in unit power consumption and/or a decrease in unit power generation; upon determining one of an increase in unit power consumption and/or a decrease in unit power generation, notifying the UCC with the request for reconnecting to the power grid; receiving a reply that includes a price quote; and upon receiving an acceptable quoted price, transmitting an agreement response. The method may also include storing a range of acceptable prices based on time-of-day at the EMU and/or communicating with the power generation system and the one or more unit appliances over the HAN through one of a wired communication and/or a wireless communication.

According to further example embodiments, a utility control center (UCC) adapted to manage power congestion conditions in a power grid through smart metering communications (SMC) is described. An example UCC may include a communication module configured to communicate with smart meters through a Neighborhood Area Network (NAN), where the smart meters are associated with units on the power grid, and one or more processing units coupled to the communication module. The processing units may receive energy profile information from a smart meter and/or evaluate the received energy profile information to determine if the unit has surplus power during a power congestion condition. The processing units may also instruct the smart meter to disconnect from the grid and transition the smart meter into one of an islanded mode or a standby mode when the unit is determined to have power surplus.

The processing units of the UCC may be configured to perform actions similar to the methods for managing power congestion conditions in a power grid through smart metering communications (SMC) discussed above. Additionally, the processing units may be configured in one of a centralized architecture and a distributed architecture.

According to yet other example embodiments, an apparatus adapted to manage unit power consumption in a smart power grid through smart metering communications (SMC) is described. An example apparatus may include a communication module configured to communicate with a power generation system and one or more appliances over a Home Area Network (HAN) associated with a unit, and a processor coupled to the communication module. The processor may determine a power consumption and a power generation within the unit through communication with the power generation system and the one or more appliances over the HAN and/or determine an energy profile for the unit based on the power consumption and the power generation. The processor may also transmit the energy profile to a utility control center (UCC) and/or disconnect the unit from the power grid upon receiving instructions from the UCC when the grid is in a power congestion condition.

The example apparatus may be a smart meter or an EMU, and the processor of the apparatus may be configured to perform actions substantially similar to the methods for managing unit power consumption in a smart power grid through smart metering communications (SMC) discussed above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage a power congestion condition in a power grid through smart metering communications (SMC), the method comprising:
    receiving energy profile information from a smart meter, wherein the smart meter is associated with units;
    evaluating the energy profile information to identify a subset of the units, wherein the subset of the units have a power surplus during the power congestion condition;
    identifying one or more of the subset of the units to disconnect from the power grid based on a ranked order of a non-increasing power demand (NID) for the subset of the units, wherein the NID increases a total value of a power demand that disregards associated power surplus by an addition of demand values in the ranked order of the power demand from $P_{D,1}$ to $P_{D,n}$, where $P_{D,n}$ denotes the power demand for an $n^{th}$ unit of the subset of the units; and
    in response to an identification of the one or more of the subset of the units having a power surplus:
        instructing the smart meter to disconnect the one or more of the subset of the units from the power grid; and
        transitioning the smart meter into one of an islanded mode and a standby mode.

2. The method according to claim 1, further comprising:
detecting an expiration of the power congestion; and
instructing the smart meter associated with the one or more of the subset of the units that are disconnected to reconnect the one or more of the subset of the units to the power grid in response to a detection of the expiration of the power congestion.

3. The method according to claim 1, further comprising:
detecting a need for grid power at the one or more of the subset of the units; and
instructing the smart meter associated with the one or more of the subset of the units that are disconnected to reconnect the one or more of the subset of the units to the power grid in response to a detection of the need for the grid power.

4. The method according to claim 1, wherein receiving the energy profile information comprises:
    receiving the energy profile information periodically from the smart meter.

5. The method according to claim 4, further comprising:
    selecting a period to receive the energy profile information from the smart meter based on one or more of a utility operation, a time of a day, and a day of a week; and
    wherein receiving the energy profile information includes receiving the energy profile information during a time period that includes one or more of: a morning of the day, an afternoon of the day, and an evening of the day.

6. The method according to claim 1, further comprising:
    communicating with a plurality of smart meters through a neighborhood area network (NAN) via one of a wired communication and a wireless communication.

7. The method according to claim 1, further comprising determining the power congestion condition by:
    determining the power congestion condition from the energy profile information based on a threshold for an available transfer capacity (ATC), wherein the ATC is computed as: ATC=a total transfer capability (TTC)–a transmission reliability margin (TRM)–an existing transmission commitments (ETC), where the TTC defines an amount of power that can be transferred over the power grid to satisfy one or more security constraints, the TRM defines an amount of TTC to ensure a security of the power grid under a range of uncertainties in system conditions, and the ETC defines a retail customer service and a capacity benefit margin (CBM); and
    determining the power congestion condition to satisfy the one or more security constraints of the smart meter, wherein the one or more security constraints include one or more of a thermal limit of the smart meter, a voltage limit of the smart meter, and a stability limit of the smart meter.

8. The method according to claim 1, wherein identifying one or more of the subset of the units to disconnect from the power grid includes:
    determining the one or more of the subset of the units to disconnect from the power grid based on determining and $$\max \sum_{n \in \hat{N}} x_n$$

$$\text{s.t.} \sum_{n \in \hat{N}} P_{S,n} \cdot x_n \leq P_{ATC}, \ x_n \in \{0, 1\} \text{ and}$$

$$\max \sum_{n \in \hat{N}} P_{D,n} \cdot x_n$$

$$\text{s.t.} \sum_{n \in \hat{N}} P_{S,n} \cdot x_n \leq P_{ATC}, \ x_n \in \{0, 1\}$$

wherein $P_{S,n}$ denotes a surplus power value and $P_{D,n}$ denotes a power demand value for each of the one or more of the subset of the units on the power grid with n=1 to N units on the power grid.

9. The method according to claim 8, further comprising:
determining a number of connected smart meters that can be achieved without exceeding a capacity constraint through use of:

$$\sum_{n \in \bar{N}} P_{S,n} \cdot x_n \leq P_{ATC}, x_n \in \{0, 1\},$$

wherein $P_{ATC}$ denotes an ATC threshold power value.

10. The method according to claim 1, further comprising:
assigning an energy efficiency to each of the one or more of the subset of the units on the power grid based on the energy profile information, wherein the energy profile information includes at least a power generation capacity and a power consumption capacity of each of the one or more of the subset of the units; and
ranking assigned energy efficiencies of the one or more of the subset of the units in a descending order; and
wherein identifying one or more of the subset of the units to disconnect from the power grid includes determining the one or more of the subset of the units to disconnect from the power grid based on the ranking.

11. The method according to claim 1, wherein each of the one or more of the subset of the units includes one of a residential household and a commercial facility.

12. The method according to claim 1, wherein identifying one or more of the subset of the units to disconnect from the power grid includes:
identifying the one or more of the subset of the units to disconnect from the power grid based on a ranked order of a non-increasing power efficiency (NIE) for the subset of the units, wherein the NIE accumulates power demand values in the ranked order of an energy efficiency from $n_1$ to $n_n$, where $n_n$ denotes the energy efficiency for the $n^{th}$ unit of the subset of the units.

13. The method according to claim 1, wherein identifying one or more of the subset of the units to disconnect from the power grid includes:
identifying the one or more of the subset of the units to disconnect from the power grid based on a ranked order of a non-decreasing power surplus (NDS) for the subset of the units, wherein the NDS is configured to select as many of the subset of the units as possible while accumulating surplus values in the ranked order of a surplus power from $P_{S,1}$ to $P_{S,n}$, where $P_{S,n}$ denotes surplus power for the $n^{th}$ unit of the subset of the units.

14. A method to manage unit power consumption in a smart power grid through smart metering communications (SMC), the method comprising:
determining, at an energy management unit (EMU), a power consumption and a power generation within units through a communication with a power generation system and one or more appliances over a home area network (HAN);
determining an energy profile for the units based on the power consumption and the power generation;
transmitting the energy profile to a utility control center (UCC);
evaluating the energy profile to identify a subset of the units, wherein the subset of the units have a power surplus during a power congestion condition;
identifying one or more of the subset of the units to disconnect from the power grid based on a ranked order of a non-increasing power demand (NID) for the subset of the units, wherein the NID increases a total value of a power demand that disregards associated power surplus by an addition of demand values in the ranked order of the power demand from $P_{D,1}$ to $P_{D,n}$, where $P_{D,n}$ denotes the power demand for an $n^{th}$ unit of the subset of the units; and
disconnecting the one or more of the subset of the units from the power grid in response to receiving an instruction to disconnect from the UCC while the power grid is in the power congestion condition.

15. The method according to claim 14, further comprising:
in response to a detection of a disconnection of the one or more of the subset of the units:
determining if an increase in the power consumption of the units has occurred;
in response to a determination of the increase in the power consumption of the units, notifying the UCC with a request to reconnect to the power grid;
determining if a decrease in the power generation of the units has occurred; and
in response to a determination of the decrease in the power generation of the units, notifying the UCC with a request to reconnect to the power grid.

16. The method according to claim 14, wherein transmitting the energy profile to the UCC comprises:
communicating with the UCC via one of the smart meter coupling the units to the power grid and a communication modem within the HAN through a neighborhood area network (NAN).

17. The method according to claim 16, wherein transmitting the energy profile includes:
transmitting the energy profile periodically to the UCC based on a selected time period, wherein the selected time period is based on one or more of: a utility operation, a time of a day, and a day of a week.

18. The method according to claim 14, wherein determining the energy profile comprises:
monitoring the power consumption and the power generation within the one or more of the subset of the units by communicating with one or more a smart appliance, a thermostat, an AC disconnect unit of the one or more of the subset of the units, and the power generation system, wherein the power generation system includes one or more of a solar power generation system, a wind power generation system, and a biomass power generation system.

19. The method according to claim 14, wherein determining the energy profile comprises:
determining the energy profile periodically during each day.

20. The method according to claim 14, wherein the instruction to disconnect is received after a disconnect decision made by the UCC, and wherein the disconnect decision is based on a ranked order of energy efficiency of the one or more of the subset of the units on the power grid.

21. The method according to claim 14, wherein the instruction to disconnect is received after a disconnect decision made by the UCC and is based on one or more of:
identifying the one or more of the subset of the units to disconnect from the power grid based on a ranked order of a non-increasing power efficiency (NIE) for the subset of the units, wherein the NIE accumulates power demand values in the ranked order of an energy efficiency from $n_1$ to $n_n$, where $n_n$ denotes the energy efficiency for the $n^{th}$ unit of the subset of the units; and
identifying the one or more of the subset of the units to disconnect from the power grid based on a ranked order of a non-decreasing power surplus (NDS) for the subset of the units, wherein the NDS is configured to select as many of the subset of the units as possible while accumulating surplus values in the ranked order of a surplus power from $P_{S,1}$ to $P_{S,n}$, where $P_{S,n}$ denotes surplus power for the $n^{th}$ unit of the subset of the units.

22. A utility control center (UCC) adapted to manage a power congestion condition in a power grid through smart metering communications (SMC), the UCC comprising:
   a communication module configured to communicate with a smart meter through a neighborhood area network (NAN), wherein the smart meter is associated with units on the power grid; and
   one or more processing units coupled to the communication module, wherein the one or more processing units are configured to:
      receive energy profile information from the smart meter, wherein the smart meter is associated with units;
      evaluate the energy profile information to identify a subset of the units, wherein the subset of the units have a power surplus during the power congestion condition;
      identify one or more of the subset of the units to disconnect from the power grid based on a ranked order of a non-increasing power demand (NID) for the subset of the units, wherein the NID maximizes a total value of a power demand that disregards associated power surplus by an addition of demand values in the ranked order of the power demand from $P_{D,1}$ to $P_{D,n}$, where $P_{D,n}$ denotes the power demand for an $n^{th}$ unit of the subset of the units; and
      in response to an identification of the one or more of the subset of the units having a power surplus:
         instruct the smart meter to disconnect the one or more of the subset of the units from the power grid and transition the smart meter into one of an islanded mode and a standby mode.

23. The UCC according to claim 22, wherein the one or more processing units are further configured to:
   detect an expiration of the power congestion;
   instruct the smart meter associated with the one or more of the subset of the units that are disconnected to reconnect the one or more of the subset of the units to the power grid in response to a detection of the expiration of the power congestion;
   detect a need for grid power at the one or more of the subset of the units; and
   instruct the smart meter associated with one or more of the subset of the units that are disconnected to reconnect the one or more of the subset of the units to the power grid upon a detection of the need for grid power.

24. The UCC according to claim 22, wherein the one or more processing units are configured to:
   receive the energy profile information periodically from the smart meter; and
   select a time period to receive the energy profile information from the smart meter based on one or more of a utility operation, a time of a day, and a day of a week.

25. The UCC according to claim 22, wherein the one or more processing units are further configured to:
   assign an energy efficiency to each of the one or more of the subset of the units on the power grid based on a power generation capacity and a power consumption capacity of each of the units.

26. The UCC according to claim 22, wherein the one or more processing units are configured in one of a centralized architecture and a distributed architecture.

27. An apparatus adapted to manage unit power consumption in a smart power grid through smart metering communications (SMC), the apparatus comprising:
   a communication module configured to communicate with a power generation system and one or more appliances over a home area network (HAN) associated with units; and
   a processor coupled to the communication module, wherein the processor is configured to:
      determine a power consumption and a power generation within the units through communication with the power generation system and the one or more appliances over the HAN;
      determine an energy profile for the units based on the power consumption and the power generation;
      transmit the energy profile to a utility control center (UCC) so as to enable the UCC to:
         evaluate the energy profile to identify a subset of the units, wherein the subset of the units have a power surplus during a power congestion condition;
         identify one or more of the subset of the units to disconnect from the power grid based on a ranked order of a non-increasing power demand (NID) for the subset of the units, wherein the NID increases a total value of a power demand that disregards associated power surplus by an addition of demand values in the ranked order of the power demand from $P_{D,1}$ to $P_{D,n}$, where $P_{D,n}$ denotes the power demand for an $n^{th}$ unit of the subset of the units; and
      disconnect the one or more of the subset of the units from the power grid in response to receiving an instruction to disconnect from the UCC while the power grid is in the power congestion condition.

28. The apparatus according to claim 27, wherein the apparatus is one of a smart meter and an energy management unit (EMU).

29. The apparatus according to claim 27, wherein the processor is further configured to:
   in response to a detection of a disconnection of the one or more of the subset of the units,
      determine if an increase in the power consumption of the one or more of the subset of the units has occurred;
      in response to a determination of the increase in the power consumption of the one or more of the subset of the units, notify the UCC with a request to reconnect to the power grid;
      determine if a decrease in the power generation of the one or more of the subset of the units has occurred; and
      in response to a determination of the decrease in the power generation of the one or more of the units, notify the UCC with the request to reconnect to the power grid.

30. The apparatus according to claim 27, wherein the processor is further configured to:
   determine one of an increase in a consumption of the unit power and a decrease in a generation of the unit power;
   in response to a determination of one of the increase in the consumption of the unit power and the decrease in the generation of the unit power, notify the UCC with a request to reconnect to the power grid;
   receive a reply from the UCC that includes a price quote;
   in response to a determination that the price quote is acceptable, transmit an agreement response to the UCC; and
   store a range of acceptable price quotes based on a time-of-day.

31. The apparatus according to claim 27, wherein the processor is further configured to:
- notify the UCC with a price quote for the power surplus to be supplied to the power grid; and
- in response to a reply that includes an acceptance, provide the power surplus to the power grid.

* * * * *